United States Patent [19]
Bender et al.

[11] Patent Number: 6,070,085
[45] Date of Patent: May 30, 2000

[54] METHOD AND APPARATUS FOR CONTROLLING TRANSMIT POWER THRESHOLDS BASED ON CLASSIFICATION OF WIRELESS COMMUNICATION SUBSCRIBERS

[75] Inventors: Paul E. Bender; Noam A. Ziv, both of San Diego, Calif.

[73] Assignee: Qualcomm Inc., San Diego, Calif.

[21] Appl. No.: 08/910,042

[22] Filed: Aug. 12, 1997

[51] Int. Cl.[7] .................................................. H04B 7/185
[52] U.S. Cl. ........................ 455/522; 455/411; 455/435
[58] Field of Search .................................... 455/411, 412, 455/418, 419, 435, 456, 522, 523, 68, 69, 426, 572, 574; 370/335, 347, 342

[56] References Cited

U.S. PATENT DOCUMENTS

| | | |
|---|---|---|
| 4,112,257 | 9/1978 | Frost ..................................... 179/2 EB |
| 4,123,718 | 10/1978 | Lampert et al. ........................ 325/474 |
| 4,765,753 | 8/1988 | Schmidt ..................................... 379/60 |
| 4,777,653 | 10/1988 | Bonnerot et al. ........................ 455/69 |
| 4,811,421 | 3/1989 | Havel et al. ................................ 455/69 |
| 4,868,795 | 9/1989 | McDavid et al. ........................ 367/77 |
| 4,870,698 | 9/1989 | Katsuyama et al. ...................... 455/67 |
| 4,901,307 | 2/1990 | Gilhousen et al. ........................ 370/18 |
| 4,922,517 | 5/1990 | West, Jr. et al. ........................ 455/426 |
| 5,056,109 | 10/1991 | Gilhousen et al. ........................ 375/1 |
| 5,093,840 | 3/1992 | Schilling ..................................... 375/1 |
| 5,101,501 | 3/1992 | Gilhousen et al. ........................ 455/33 |
| 5,103,459 | 4/1992 | Gilhousen et al. ........................ 375/1 |
| 5,107,487 | 4/1992 | Vilmur et al. ............................ 370/18 |
| 5,128,965 | 7/1992 | Henriksson ............................... 375/58 |
| 5,204,876 | 4/1993 | Bruckert et al. ............................. 375/1 |
| 5,220,678 | 6/1993 | Feei .......................................... 455/69 |
| 5,245,629 | 9/1993 | Hall ............................................. 375/1 |
| 5,257,283 | 10/1993 | Gilhousen et al. ........................... 375/1 |
| 5,265,119 | 11/1993 | Gilhousen et al. ........................... 375/1 |
| 5,267,262 | 11/1993 | Wheatly, III ................................. 375/1 |
| 5,305,468 | 4/1994 | Bruckert et al. .......................... 455/69 |
| 5,383,219 | 1/1995 | Wheatley, III et al. ................ 370/342 |
| 5,390,338 | 2/1995 | Bodin et al. ............................ 455/33.1 |
| 5,450,616 | 9/1995 | Rom ........................................ 455/69 |
| 5,465,399 | 11/1995 | Oberholtzer et al. .................... 455/69 |
| 5,475,735 | 12/1995 | Williams et al. ....................... 455/403 |
| 5,485,486 | 1/1996 | Gilhousen et al. ..................... 370/335 |

(List continued on next page.)

FOREIGN PATENT DOCUMENTS

| | | |
|---|---|---|
| 9004293 | 4/1990 | WIPO . |
| 9406218 | 3/1994 | WIPO .............................. H04Q 7/04 |
| WO 98/38819 | 9/1998 | WIPO .............................. H04Q 7/22 |

OTHER PUBLICATIONS

Weiss, et al. "Conventional Local Area Radio Coverage System" Motorola Technical Developments vol. 13 (Jul. 1991), pp. 67–69.

*Primary Examiner*—William G. Trost
*Assistant Examiner*—Sonny Trinh
*Attorney, Agent, or Firm*—Phillip Wadsworth; Sean English; Pavel Kalousek

[57] ABSTRACT

The present invention provides a method and apparatus for allowing a base station or base station controller to adjust transmissions to fixed location subscribers in closed-loop communication systems. In a closed-loop communication system, a base station exchanges signals with both fixed location and mobile user stations. When a user or subscriber initially registers with the base station, the base station determines a status of this subscriber based on, for example, an electronic serial number transmitted to the base station. The base station compares the electronic serial number to a database (Home Location Register) which determines whether the user corresponds to a fixed station or a mobile station. If the user is a fixed station, then the base station lowers nominal and minimum power level thresholds. Based on the lowered thresholds, the base station thereafter transmits forward link signals to the fixed station at a lower power level. As a result, the base station can increase its capacity due to the lower overall power rate.

15 Claims, 4 Drawing Sheets

U.S. PATENT DOCUMENTS

| | | | |
|---|---|---|---|
| 5,487,180 | 1/1996 | Ohtake | 455/54.1 |
| 5,533,027 | 7/1996 | Akerberg et al. | 370/347 |
| 5,568,153 | 10/1996 | Beliveau | 342/357 |
| 5,603,084 | 2/1997 | Henry, Jr. et al. | 455/419 |
| 5,603,096 | 2/1997 | Gilhousen et al. | 455/69 |
| 5,710,982 | 1/1998 | Laborde et al. | 455/69 |
| 5,790,940 | 8/1998 | Laborde et al. | 455/69 |
| 5,812,938 | 9/1998 | Gilhousen et al. | 455/69 |
| 5,815,798 | 9/1998 | Bhagalia et al. | 455/13.4 |
| 5,864,760 | 1/1999 | Gilhousen et al. | 455/442 |

METHOD AND APPARATUS FOR CONTROLLING TRANSMIT POWER THRESHOLDS BASED ON CLASSIFICATION OF WIRELESS COMMUNICATION SUBSCRIBERS

BACKGROUND OF THE INVENTION

1. Field of the Invention

The present invention relates to communication systems. More particularly, the present invention relates to a method and apparatus for providing power control in a closed-loop communication system.

2. Description of the Related Art

The use of code division multiple access (CDMA) modulation techniques is one of several techniques for facilitating communications in which a large number of system users exist. Other multiple access communication system techniques, such as time division multiple access (TDMA) and frequency division multiple access (FDMA) are known in the art. However, the spread spectrum modulation techniques of CDMA has significant advantages over other modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, and is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," also assigned to the assignee of the present invention, and is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user or mobile station through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention and incorporated by reference herein.

If the transmission power of signals transmitted by the base station to a mobile station are too high, it can create problems such as interfering with other mobile stations. As a result, most base stations have a fixed amount of power at which to transmit signals, and therefore can transmit to only a limited number of mobile stations. Alternatively, if the transmission power of signals transmitted by the base station are too low, then the mobile station can receive multiple erroneous transmitted frames. Terrestrial channel fading and other known factors can affect the transmission power of signals transmitted by the base station. As a result, each base station must rapidly and accurately adjust the transmission power for the signals which it transmits to the mobile stations. A method and apparatus for controlling transmission power is disclosed in U.S. Pat. No. 5,056,109, entitled "METHOD AND APPARATUS FOR CONTROLLING TRANSMISSION POWER IN A CDMA CELLULAR TELEPHONE SYSTEM," assigned to the assignee of the present invention and incorporated by reference herein.

The CDMA communication system can also exchange signals with fixed location stations. Such fixed stations typically employ directional antennas and thereby communicate with only certain sectors of one or more base stations. Fixed stations also typically lack fading concerns caused by movement of the station. Consequently, the fixed nature of such fixed stations, their directional antennas, as well as other factors, allow such stations to enjoy increased performance over mobile stations. Such fixed stations often operate as wireless local loops with their corresponding base stations, and thus require less overhead from the communication system. As a result, subscribers of fixed stations typically enjoy less expensive service.

SUMMARY OF THE INVENTION

The present invention allows a base station or base station controller to select a method of controlling transmission power to and from a remote station based on a determination as to whether the remote station is fixed or mobile. For example, the base station can determine the status of a subscriber based on, for example, an electronic serial number in a registration signal received therefrom. If the electronic serial number received corresponds to a fixed station, then the base station lowers one or more power thresholds. Based on such lowered thresholds, the base station thereafter transmits forward link signals to the fixed station at a lower power level. As a result, the base station can increase its capacity due to the reduced power transmission to fixed remote stations. Similarly, the remote station can adjust its thresholds based on whether it is being operated in a fixed or mobile mode. If the base station determines that the fixed station has moved from its prescribed location, then the base station can adjust its threshholds accordingly or restrict communication of the fixed station.

In the exemplary embodiment, the transmission power of the station is controlled by comparing its received Signal to Noise Ratio (SNR) at the base station against a threshold, then transmitting a power control command to increase or decrease remote station power based upon that comparison. The SNR threshold is driven by the Frame Error Rate (FER) of frames received at the remote station. The transmission power of signals transmitted by the base station to the remote station is controlled in accordance the forward link (FL) frame error rate which is reported by the remote station. The present invention is equally applicable to both of these control methods.

In a broad sense, the present invention embodies a comunication system having a base station, at least one fixed location user station and one mobile user station. System users of the user stations exchange signals with the base station. A method for controlling transmission signal power of transmitted communication signals for the base station includes the steps of: (a) determining if a currently received signal was transmitted by the fixed user station, and (b) adjusting transmission of signals to the fixed user station if the current signal was transmitted by the fixed user station.

BRIEF DESCRIPTION OF THE DRAWINGS

The features and advantages of the present invention will become more apparent from studying the detailed description together with the following figures. In the figures, like reference characters identify similar elements.

DETAILED DESCRIPTION OF THE PREFERRED EMBODIMENTS

A communication system, and in particular, a power control apparatus and method for the system, is described in detail herein. In the following description, numerous specific details are set forth in order to provide a thorough understanding of the present invention. One skilled in the relevant art, however, will readily recognize that the present invention can be practiced without these specific details, or with alternative elements or steps. In other instances, well-known structures and methods are not shown in detail in order to avoid obscuring the present invention.

Figure 1:
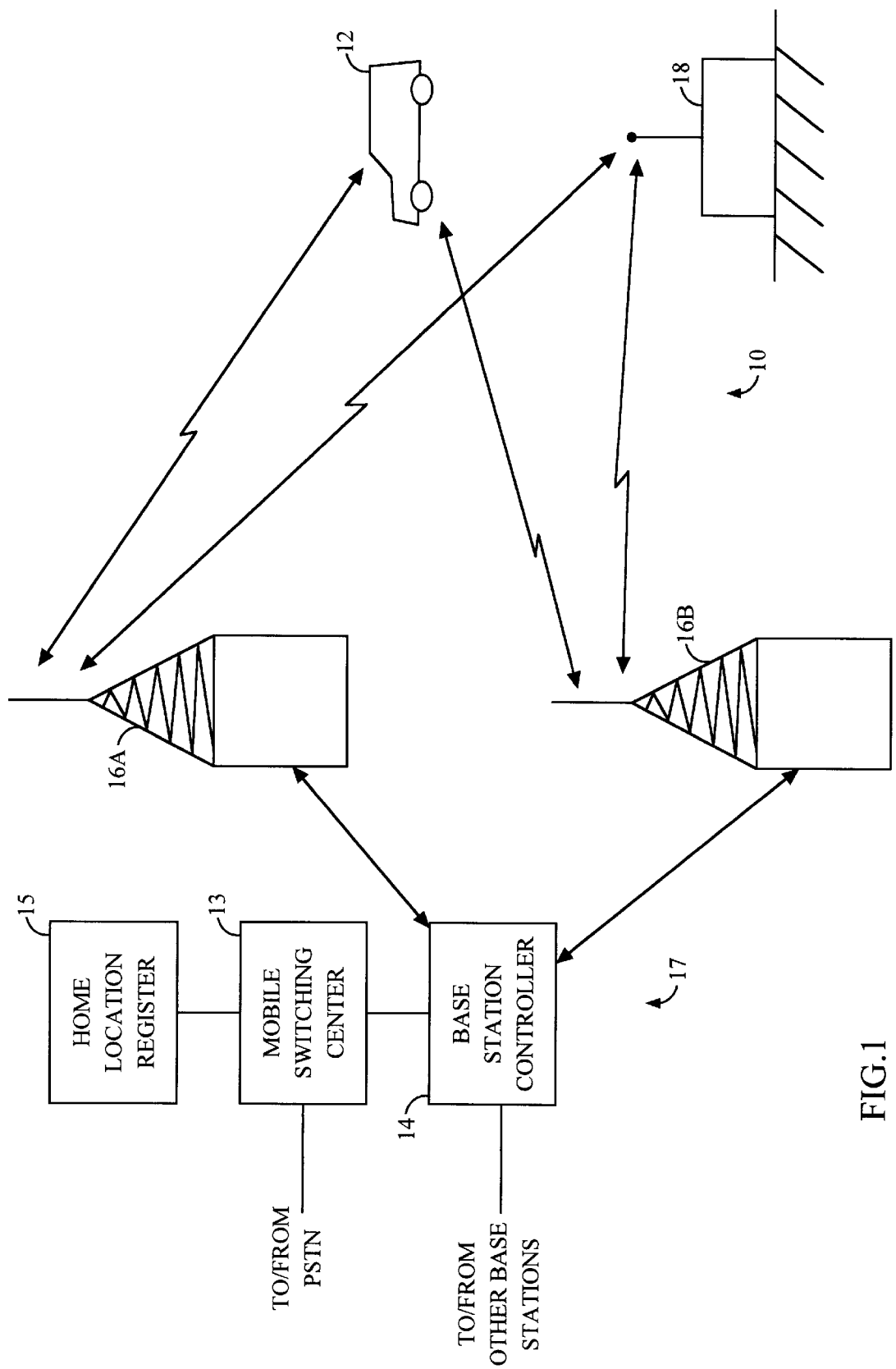
FIG. 1 illustrates a general closed loop power control system of the present invention.

FIG. 1 illustrates exemplary cellular subscriber communication system 10 in which the present invention may be embodied. The system of FIG. 1 preferably utilizes spread spectrum modulation techniques such as CDMA for communicating between remote stations (e.g., mobile telephones) and cell-sites or base stations. In FIG. 1, remote station 12 communicates with user station controller 14 by means of one or more base stations 16a, 16b, etc. Fixed station 18 similarly communicates with base station controller 14, but by means of only one or more base stations, such as base stations 16a and 16b. Since communication system 10 preferably employs CDMA techniques, fixed station 18 preferably communicates with one sector of the two base stations 16a and 16b, although the fixed station can communicate with other base stations as may be required due to outages, changes in cell layout or load, etc.

Base station controller 14 is coupled to and typically includes interface and processing circuitry for providing system control to base stations 16a and 16b. Base station controller 14 can also be coupled to and communicate with other base stations, and possibly even other base station controllers. Base station controller 14 is also coupled to mobile switching center 13, which in turn is coupled to home location register 15. During registration of each user station at the beginning of each call, base station controller 14 and mobile switching center 13 compare registration signals received from the user station to data contained in home location register 15, as is known in the art and described more thoroughly below.

When system 10 is configured to process telephone calls, base station controller 14 and mobile switching center 13 route telephone calls from a public switched telephone network (PSTN) to base station 16a or 16b for transmission to the appropriate mobile station 12 or fixed station 18. Also, base station controller 14 and mobile switching center 13 function to route calls from mobile station 12 and fixed station 18 to the PSTN, as well as between mobile stations and fixed stations. In sum, base station controller 14 establishes, maintains and terminates the wireless link with mobile station 12 and fixed station 18, while mobile switching center 13 establishes, maintains and terminates communications with the PSTN. Mobile Switching Center (MSC) 13, base station controller (BSC) 14 and home location register (HLR) 15 are collectively referred to herein as wireless infrastructure.

Base station controller 14 can be coupled to base stations 16a and 16b by various means such as dedicated telephone lines, optical fiber links or microwave communication links. Double-arrowed lines shown in FIG. 1 define the possible communication links between mobile station 12, fixed station 18 and base stations 16a and 16b, and between the base stations and base station controller 14.

Figure 2:
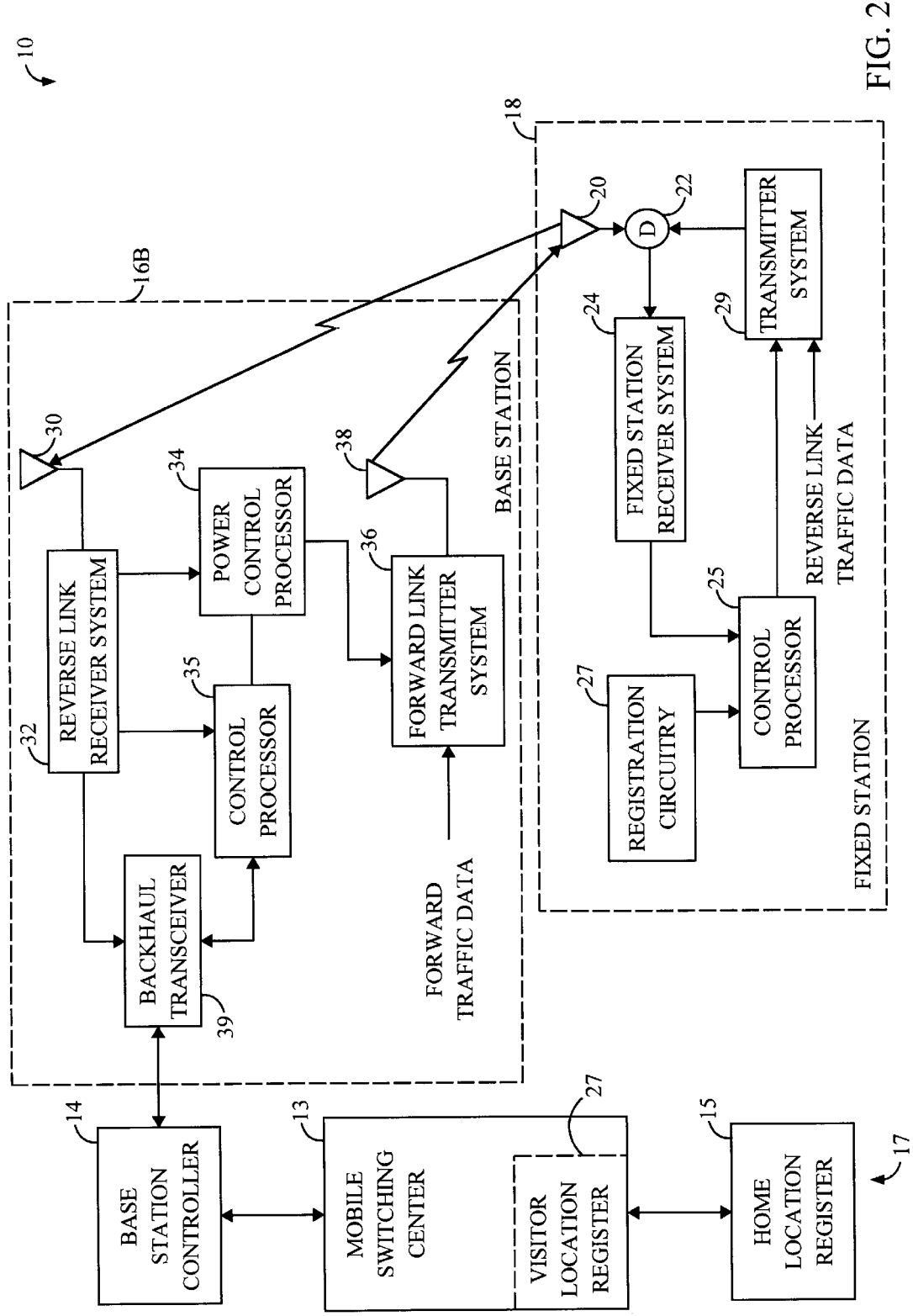
FIG. 2 is a block diagram of a portion of the closed loop power control system of FIG. 1.

Referring to the block diagram of communication system 10 in FIG. 2, fixed station 18 includes antenna 20 that transmits signals to, and receives signals from, base stations 16a and 16b. While FIG. 2 shows only base station 16b, those skilled in the art will recognize that base station 16a is substantially similarly configured, and thus the following discussion applies equally to base station 16a.

Duplexer 22 provides a forward link signals from base station 16b to fixed station receiver system 24. Receiver system 24 down-converts, demodulates and decodes the received signal. Receiver system 24 then provides a predetermined parameter or set of parameters or signals to control processor 25. Examples of parameters might include measured signal to noise ratio (SNR), measured received power, and/or decoder parameters such as symbol error rate, Yamamoto metric, or parity bit check indication. In the exemplary embodiment, the parameter provided by receiver system 24 is frame error rate.

Control processor 25 receives the parameters from receiver system 24 and determines the adequacy of the parameter. In a preferred embodiment, control processor 25 compares the measured Frame error rate on the forward link to a threshold to determine whether the forward link signal should be increased or decreased, and generates a corresponding power level signal. Control processor 25 generates a power control command which in the exemplary embodiment is a binary up/down command. The power control command is provided to transmission system 29 which transmits the command to base station 16b. The power control command is received at antenna 30, and downconverted, filtered, demodulated and provided to power control processor 34. Power control processor 34 determines an adjustment to the forward link transmission power based on whether the remote station 18 is fixed or mobile. In particular, the amount the transmission power is changed when the remote station is fixed is less than if the remote station is mobile, because fixed stations are not as subject to deep fades in the propagation path as are mobile stations. In addition, in the exemplary embodiment, there is a minimum transmission power threshold above which all signals from the base station are transmitted. In the exemplary embodiment, the minimum transmission power threshold for fixed stations is less than for mobile stations.

Registration circuitry 27 provides registration data to control processor 25, including an electronic serial number (ESN) or other unique number assigned to fixed station 18, as described below. Transmitter system 29 encodes, modulates, amplifies and up converts the power level signals and ESN, via duplexer 22 and antenna 20. In the exemplary embodiment, transmitter system 29 provides the power control commands in predetermined locations of outgoing reverse link frames. Transmitter system 29 also receives reverse link traffic data which can correspond to voice data from the user of fixed station 18.

In the above-noted alternative embodiment, where the power level signals reflect not a command to increase or decrease power, but instead reflect the measured received power of the forward link signals, power control processor 34 compares the power level signals to the nominal, minimum and maximum power level thresholds. Based on such comparison, power control processor 24 produces the forward link transmitter power signal to forward link transmitter system 36. Forward link transmitter system 36 either increases, maintains, or decreases the power of the forward link signal in response to the transmitter power signal, subject to the minimum and maximum transmission power levels that are determined based on whether the remote station is fixed or mobile.

In yet another alternative embodiment, fixed station 18 does not provide power control commands back to base station 16b. Instead an open loop power control is performed wherein base station 16b monitors the quality of the reverse link channel. As is known, the quality of the forward link channel is related to a quality of the reverse link channel through differences in frequency dependent fading make this method of control suboptimal. Therefore, power control processor 34 monitors the quality of the reverse link channel and produces appropriate transmitter power signals to forward link transmitter system 36 to control power of transmitted forward link signals. The adjustments to the transmission power are determined in accordance with the determination as to whether the remote station is fixed or mobile.

The forward link signal is transmitted via transmitting antenna 38. Forward link transmitter system 36 also receives forward link traffic data which it encodes, modulates and transmits via antenna 38. In the exemplary embodiment, receiver system 24, transmitter system 29, receiver system 32 and transmitter system 36 are either a CDMA receiver or transmitter as described in the aforementioned U.S. Pat. No. 4,901,307 and U.S. Pat. No. 5,103,459, under the exemplary embodiment.

Backhaul transceiver 39 transmits the registration messages and reverse link traffic to base station controller 14. The registration message includes the ESN for fixed station 18, and also, or alternatively, mobile identification number (MIN) (e.g., "phone number" for the fixed station), international mobile subscriber identification (IMSI) and/or temporary mobile subscriber identification (TMSI), all of which uniquely identify the remote 18. Base station controller 14 strips the ESN, MIN, IMSI and/or TMSI from the registration message and provides such resulting registration data to mobile switching center 13. Alternatively, control processor 35 strips such registration data from the registration signal and provides such data to mobile switching center 13 through base station controller 14. Details on registration of user stations in a CDMA communication system are well known and are described in detail in interim specification Telecommunication Industry Association Interim Standard IS-41.

Mobile switching center 13 retrieves an appropriate user profile for remote station 18 in response to the ESN, MIN, IMSI and/or TMSI. The user profile is stored in either home location register 15 or visitor location register 27 that forms part of mobile switching center 13. Visitor location register 27 effectively is a cache or higher speed storage of user profiles located at mobile switching center 13. Conversely, home location register 15 can be a remote storage facility having a database of all user profiles. Home location register 15 can thus exchange user profiles and other information with various mobile switching centers 13 in communication system 10.

Each user profile, stored at visitor location register 27 and/or home location register 15, includes a corresponding status or classification of each subscriber or station in communication system 10, indicating whether such station is mobile, such as mobile station 12, or fixed, such as fixed station 18. As described more thoroughly below, mobile switching center 13 compares all incoming ESNs to visitor or home location register 15 or 37 during registration of each new subscriber to determine whether the subscriber corresponds to a mobile station or a fixed station. If mobile switching center 13 determines that a new subscriber corresponds to a fixed station, mobile switching center provides a fixed location status signal to control processor 35, through base station controller 14 and backhaul transceiver 39. Control processor 35, in response thereto, adjusts nominal, minimum and maximum power level thresholds lower, and rate of change and target FER. In an alternative embodiment, remote station 18 transmits a message to base stations 16 indicating whether it is operating in a fixed or mobile mode.

Control processor 35 of base station 16b continually monitors a quality of the received reverse link signal from fixed station 18. Based on such comparison, control processor 35 transmits power control messages to remote station 18. In response thereto, control processor 25 adjusts the power of reverse link signals transmitted via transmitter system 29. When control processor 35 determines that a new subscriber corresponds to fixed station 18, the control processor lowers its nominal, minimum and maximum quality measurement thresholds with which it compares the quality of the reverse link channel. As a result, control processor 35 transmits power control messages to remote station 18 that instruct remote station 18 to decrease power of its reverse link signals.

Unless described otherwise below, the construction and operation of the various blocks shown in FIG. 2 are of conventional design. As a result, such blocks need not be described in further detail herein, because they will be understood by those skilled in the relevant art. Such description is omitted for purposes of brevity and so as not to obscure description of the present invention. Any modifications necessary to the blocks of communication system 10 in FIG. 2 can be readily made by one skilled in the art based on the detailed description provided herein.

Figure 3:
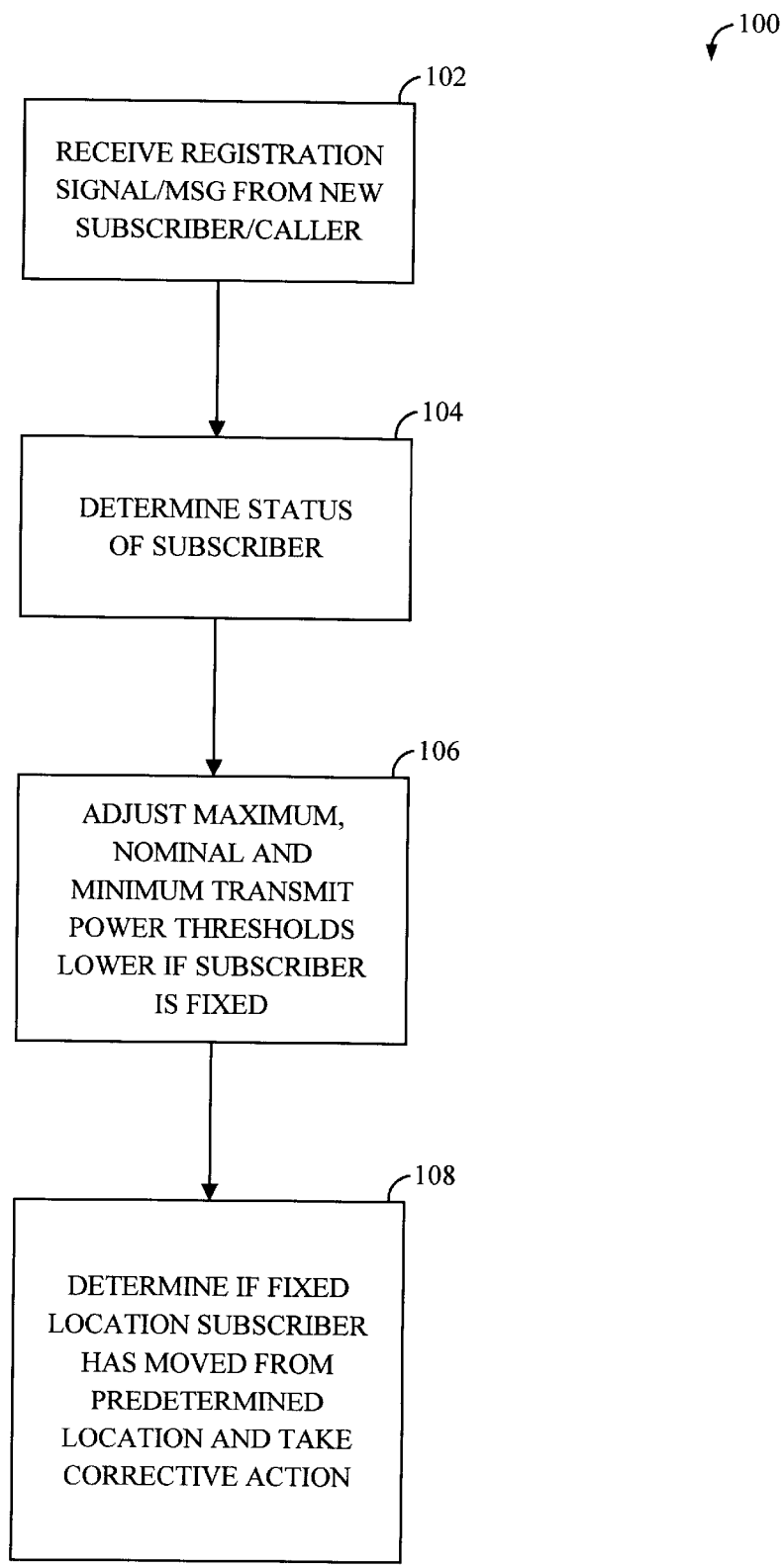
FIG. 3 is an exemplary flow diagram of a method for adjusting the transmission power of transmissions between the base station and the fixed station under the present invention.

Referring to the flowchart of FIG. 3, a routine 100 performed by communication system 10 adjusts the power level thresholds employed by base station 16b and/or remote station 18 in response to a classification of each newly registered subscriber. Those skilled in the relevant art can create source code based on the flowchart of FIG. 3 and the detailed description provided herein. Routine 100 is preferably stored in memory (not shown).

In step 102, base station 16b receives a new registration message or signal from a subscriber initially registering with communication system 10. The received signal includes the ESN or other identification number for the new subscriber (e.g., MIN, IMSI, TMSI, etc.). Control processor 35 instructs backhaul transceiver 39 to forward the registration signal to mobile switching center 13, via base station controller 14.

In step 104, HLR 15 or 27 determines a status of the new subscriber. HLR 15 or 27 compares the newly received ESN to ESNs stored in visitor or home location register 15 or 27.

Based on a comparison therewith, HLR 15 or 27 sends a message indicating the status to mobile switching center 13. If the remote station is fixed, then mobile switching center 13 provides a fixed location status signal to control processor 35 of base station 16b.

In step 106, control processor 35 adjusts or lowers nominal, maximum and minimum power level thresholds, which are provided to power control processor 34. Alternatively, control processor 35, after determining that the new subscriber is a fixed station, provides an adjustment signal to power control processor 34, which in response thereto, employs lower nominal, maximum and minimum power level thresholds.

Thereafter, power control processor 34 employs such lower nominal, maximum and minimum power level thresholds and others listed earlier. Power control processor 34 compares received power level signals with the lower nominal and minimum power level thresholds to produce appropriate transmitter power signals. As noted above, transmitter system 36, in response thereto, transmits forward link signals to remote station 18, at such lower power levels. By employing lower power levels for remote station 18, base station 16b has increased capacity as compared with transmitting signals to remote station 18 at standard power levels.

Figure 4:
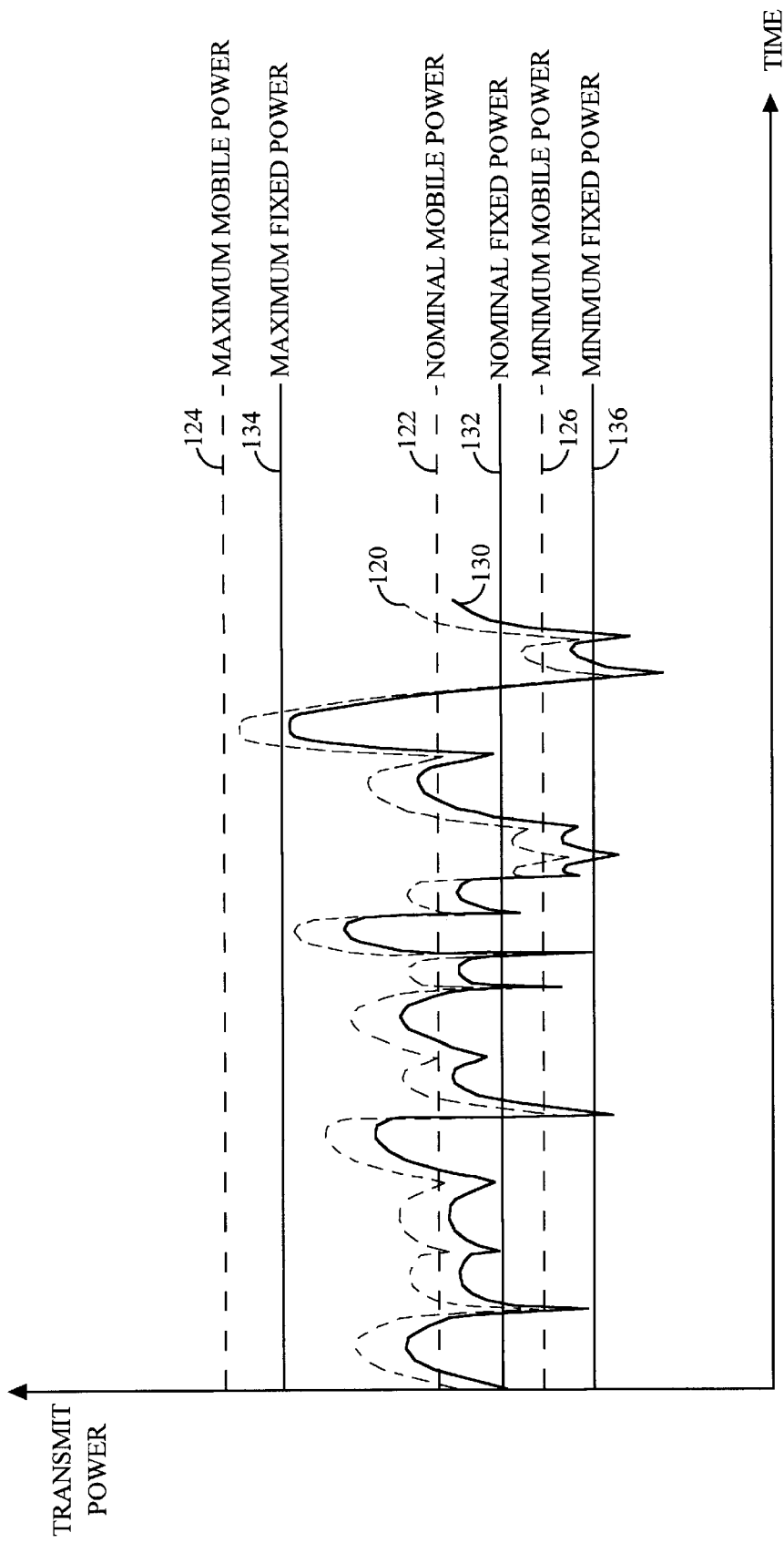
FIG. 4 is an exemplary waveform diagram of forward link signals transmitted by the base station to mobile and fixed user stations, and exemplary thresholds for minimum, nominal and maximum thresholds established by the base station based upon a classification of the user station.

Referring to FIG. 4, exemplary forward link signals are shown as transmitted by base station 16b to mobile station 12 (shown in broken lines) and to fixed station 18 (shown in solid lines). Base station 16b typically establishes nominal mobile power threshold 122, maximum mobile power threshold 124 and minimum mobile power threshold 126, as shown in FIG. 4. However, when base station 16b determines that a newly registered subscriber corresponds to a fixed station, the base station establishes nominal fixed power threshold 132, maximum fixed power threshold 134 and minimum fixed power threshold 136 at a level below nominal, maximum and minimum mobile power thresholds 122, 124 and 126, respectively. If forward link signals are currently being transmitted at the minimum threshold, the minimum power level threshold is not lowered further.

Nominal, maximum and minimum fixed power thresholds 132,134 and 136, respectively, are preferably established at a fixed value below nominal, maximum and minimum mobile power thresholds 122,124 and 126, respectively (e.g., 5–15 dB lower). The actual fixed amount at which such thresholds are established are based on a variety of factors, including current capacity of base station 16b, external interference present within the sector of base station 16b with which fixed station 18 communicates, etc. In a preferred embodiment, base station controller 14 determines nominal, maximum and minimum power thresholds 132,134 and 136, as well as thresholds 122, 124 and 126, for base station 16b.

Control processor 35 also lowers its internal nominal, minimum and maximum quality thresholds with which it compares the quality of the reverse link channel. Based on such lower thresholds, control processor 35 generates and transmits power control messages to fixed station 18, which in response thereto, lowers transmission power of its reverse link signals. As a result, signals transmitted by fixed station 18 similarly have lower nominal, minimum and maximum power levels.

In step 108, mobile switching center 13 also determines if fixed station 18 has moved from its predetermined location. For example, a user of fixed station 18 may have improperly moved the fixed station and operating it, for example, as a mobile station. Mobile switching center 13 determines that fixed station 18 has moved from its predetermined location by determining if base station 16b receives signals from the fixed station via another sector, or from another unassigned base station. Alternatively, base station controller 14 can measure a change in round trip signal delay with fixed station 18 if it has moved from its predetermined location.

If so, mobile switching center 13 takes corrective action such as restricting or limiting communications with now mobile fixed station 18. For example, mobile switching center 13 can instruct base station 16b, or another base station, to drop any call with now mobile fixed station 18. Additionally, mobile switching center 13 can instruct base station 16b or other base stations to limit fixed station 18's hand-off with other base stations, allowing the fixed station to transmit only emergency calls, etc. Furthermore, mobile switching center 13 can simply access billing records for fixed station 18 and provide appropriate increases for such user due to the change in status from fixed to mobile.

Various alternative embodiments of the exemplary embodiment described above are possible. In a first alternative embodiment, the user profiles are stored within home location register 15, and a delay exists between requests from mobile switching center 13, and when home location register 15 provides an appropriate user profile thereto. In this first embodiment, base station controller immediately moves a new subscriber from an overhead channel to a traffic channel while mobile switching center 13 performs appropriate registration for the new subscriber. After determining that the new subscriber is fixed station 18, mobile switching center 13 instructs base station 16b to adjust its minimum and maximum power level thresholds. The nominal power level threshold, however, cannot now be readjusted since the call is already underway.

In a second alternative embodiment, all registration and determination functions under the routine 100 are performed at base station 16b. Therefore, base station 16b includes a database of user profiles, similar to the home and visitor location registers 15 and 27. Base station 16b receives the ESN from fixed station 18, and compares it to its database of user profiles to determine that the new subscriber is fixed station 18. Thereafter, base station 16b adjusts the nominal, maximum and minimum thresholds lower.

Although specific embodiments of, and examples for, the present invention are described herein for illustrative purposes, various equivalent modifications can be made without departing from the spirit and scope of the invention, as will be recognized by those skilled in the relevant art. For example, the various embodiments described herein can be combined to provide further embodiments. In general, the power control routine described in detail above is exemplary, and those skilled in the relevant art can create similar routines under the teachings and concepts of the present invention.

The teachings provided herein of the present invention can be applied to other communication systems, not necessarily the exemplary CDMA communication system described above. For example, while the present invention has been generally described above as being employed in the CDMA communication system 10, the present invention is equally applicable to other digital or analog cellular communication systems. The present invention can also be modified, if necessary, to employ the systems, circuits and concepts of the various patents described above, all of which are incorporated herein by reference as if set forth in their entirety.

These and other changes can be made to the invention in light of the above detailed description. In general, in the following claims, the terms used should not be construed to limit the invention to the specific embodiments disclosed in the specification and the claims, but should be construed to include any communication system that operates in accordance with the claims to provide transmission power control. Accordingly, the invention is not limited by the disclosure, but instead its scope is to be determined entirely by the following claims.

What is claimed is:

1. In a communication system having a base station, a base station controller communicating with said base station, at least one fixed location user station and at least one mobile user station, wherein users of said user stations transmit signals to and receive communication signals from said base station, a method for controlling transmission signal power of said communication signals transmitted by said base station, the method comprising the steps of:
   at said base station, receiving a current signal from said fixed user station or said mobile user station;
   at said base station controller, determining if said current signal was transmitted by said fixed user station; and
   at said base station, reducing a power threshold of communication signals transmitted to said fixed user station if said current signal was transmitted by said fixed user station.

2. The method of claim 1 wherein said base station controller includes a mobile switching center and a registry of all user stations in said communication system, wherein the step of receiving includes the step of receiving a unique electronic serial number assigned to said fixed user station; and
   wherein the step of determining includes the steps of:
      at said mobile switching center, comparing said unique electronic serial number to said registry, said registry identifying a classification of all user stations as being mobile or fixed based on assigned electronic serial numbers for all user stations; and
      determining that said current signal was transmitted by said fixed user station if said unique electronic serial number corresponds to said fixed user station in said registry.

3. The method of claim 1 wherein said base station transmits said communication signals to said user stations based on nominal, maximum and minimum power thresholds, and wherein the step of reducing a power threshold includes the step of reducing each of said nominal, maximum and minimum power thresholds by a fixed amount.

4. The method of claim 1, further comprising the steps of:
   at said base station controller, determining that said fixed user station has moved from a predetermined location; and
   at said base station, restriction communication of said fixed user station with said communication network.

5. The method of claim 1 wherein the of step receiving a current signal includes the step of receiving a code division multiple access (CDMA) spread spectrum signal.

6. The method of claim 1, further comprising the steps of:
   at said base station, reducing a reverse link quality threshold;
   at said base station, comparing a quality of signals received from said fixed user station to said reduced quality threshold; and
   at said base station, transmitting power control messages to said fixed user station based on said step of comparing.

7. In a communication system having a base station, at least one fixed location user station and one mobile user station, wherein users of said user stations exchange signals with said base station, a method comprising the steps of:
   determining if a currently received signal was transmitted by said fixed user station;
   reducing a maximum energy threshold for signals transmitted to said fixed user station if said current signal was transmitted by said fixed user station; and
   adjusting transmission of signals to said fixed user station in accordance with said threshold.

8. In a communication system having a base station, at least one fixed location user station and one mobile user station, wherein users of said user stations exchange signals with said base station, a method comprising the steps of:
   determining if a currently received signal was transmitted by said fixed user station;
   adjusting transmission of signals to said fixed user station if said current signal was transmitted by said fixed user station;
   reducing a reverse link threshold if said current signal was transmitted by said fixed user station;
   comparing a signals received from said fixed user station to said reduced reverse link threshold; and
   transmitting control messages to said fixed user station based on said step of comparing.

9. In a communication system having base station means, at least one fixed location user station means and one mobile user station means, wherein users of said user station means exchange signals with said base station means, a system comprising:
   means for determining if a currently received signal was transmitted by said fixed user station means;
   means, coupled to said means for determining, for reducing nominal and minimum energy thresholds for said fixed user station means if said current signal was transmitted by said fixed user station means, and
   means for adjusting transmission of signals to said fixed user station in accordance with said reduced nominal and minimum energy thresholds.

10. A communication system comprising:
    a base station;
    at least one mobile user station configured to exchange signals with said base station;
    at least one fixed location user station configured to exchange said signals with said base station; and
    wherein said base station is configured:
       to determine if a currently received signal was transmitted by said fixed user station,
       to reduce nominal and maximum energy thresholds for said fixed user station if said current signal was transmitted by said fixed user station, and
       to adjust transmission of said signals to said fixed user station in accordance to said reduced nominal and maximum energy thresholds.

11. A communication system comprising:
    a base station;
    at least one mobile user station configured to exchange signals with said base station;
    at least one fixed location user station configured to exchange said signals with said base station; and
    a base station controller, wherein said base station controller is configured to reduce nominal and maximum energy thresholds for said fixed user station if said current signal was transmitted by said fixed user station, and wherein said base station is configured:
  to determine if a currently received signal was transmitted by said fixed user station, and
  to adjust transmission of said signals to said fixed user station in accordance to said reduced nominal and maximum energy thresholds.

12. A communication system comprising:
  a base station;
  at least one mobile user station configured to exchange signals with said base station;
  at least one fixed location user station configured to exchange said signals with said base station; and
  wherein said base station is configured:
    to determine if a currently received signal was transmitted by said fixed user station;
    to adjust transmission of said signals to said fixed user station if said current signal was transmitted by said fixed user station;
    to reduce a reverse link threshold if said current signal was transmitted by said fixed user station;
    to compare said signals received from said fixed user station to said reduced reverse link threshold; and
    to transmit control messages to said fixed user station based on said comparison.

13. In a communication system having at least one fixed location user station and one mobile user station, a base station exchanging signals with said fixed and mobile stations comprising:
  a receiver that receives a current signal from said mobile or fixed user station;
  a processor coupled to said receiver and being configured:
    to determine if said currently received signal was transmitted by said fixed user station; and
    to reduce nominal and maximum energy thresholds for said fixed user station if said current signal was transmitted by said fixed user station; and
  a transmitter coupled to said processor that reduces a power of signals transmitted to said fixed user station.

14. In a communication system having at least one fixed location user station and one mobile user station, a base station exchanging signals with said fixed and mobile stations comprising:
  a receiver that receives a current signal from said mobile or fixed user station;
  a processor coupled to said receiver and being configured to determine if said currently received signal was transmitted by said fixed user station;
  a base station controller configured to reduce nominal and maximum energy thresholds for said fixed user station and communicate said reduced nominal and maximum thresholds to said processor if said current signal was transmitted by said fixed user station; and
  a transmitter coupled to said processor that reduces a power of signals transmitted to said fixed user station.

15. In a communication system having at least one fixed location user station and one mobile user station, a base station exchanging signals with said fixed and mobile stations comprising:
  a receiver that receives a current signal from said mobile or fixed user station;
  a processor coupled to said receiver and being configured to:
    determine if said currently received signal was transmitted by said fixed user station;
    to reduce a reverse link threshold if said current signal was transmitted by said fixed user station;
    to compare a signals received from said fixed user station to said reduced reverse link threshold, and
    to transmit control messages to said fixed user station based on said comparison; and
  a transmitter coupled to said processor that reduces a power of signals transmitted to said fixed user station if said current signal was transmitted by said fixed user station.

* * * * *

UNITED STATES PATENT AND TRADEMARK OFFICE
CERTIFICATE OF CORRECTION

PATENT NO. : 6,070,085  
DATED : May 30, 2000  
INVENTOR(S) : Bender et al.

Page 1 of 1

It is certified that error appears in the above-identified patent and that said Letters Patent is hereby corrected as shown below:

Column 5,
Line 7, delete "24" and insert -- 34 --.

Column 6,
Line 12, delete "37" and insert -- 27 --.

FIG. 1, please remove the reference number "17".

FIG. 2, please remove the reference number "17".

Signed and Sealed this

Twenty-fifth Day of December, 2001

Attest:

Attesting Officer

JAMES E. ROGAN
Director of the United States Patent and Trademark Office